Figure 2:
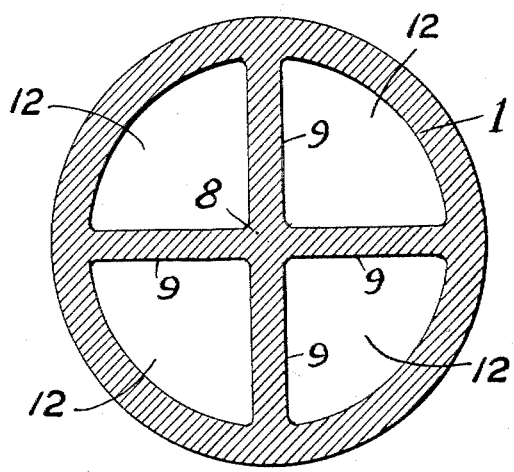

Jan. 15, 1929.

O. B. EVANS 1,699,231

WATER GAS GENERATOR

Filed Oct. 13, 1924

WITNESS:

INVENTOR

Owen Brooke Evans
BY
Augustus B. Stoughton
ATTORNEY.

Patented Jan. 15, 1929.

1,699,231

UNITED STATES PATENT OFFICE.

OWEN B. EVANS, OF PHILADELPHIA, PENNSYLVANIA, ASSIGNOR TO IRA C. COPLEY, OF AURORA, ILLINOIS.

WATER-GAS GENERATOR.

Application filed October 13, 1924. Serial No. 743,211.

The principal objects of the present invention are, first to increase the output of the water gas generator without increasing its grate area; second, to insure substantial uniformity in the distribution of porosity throughout the entire fuel bed; and third, to provide an enlarged gas making region with the same external water gas generator wall.

Generally stated, my invention comprises a generator having fuel chambers at the top and bottom thereof bounded by the inner wall of the generator and having a gas off-take communicating with said chambers and having vertical fuel passages connecting said fuel chambers and arranged at the intermediate portion of the generator and formed through a bridge structure provided between the top and bottom fuel chambers, the construction and arrangement being such that fuel descending through the chambers and passages encounters a blast ascending through the generator grate whereby friction and heat conditions are substantially identical at the confronting walls of the passages with the result that uniform distribution of porosity and an enlarged gas making region are insured.

The invention also comprises the improvements to be presently described and finally claimed.

In the following description reference will be made to the accompany drawing forming part hereof and in which is illustrated one embodiment of the invention chosen for illustration.

In the drawings

Figure 1:
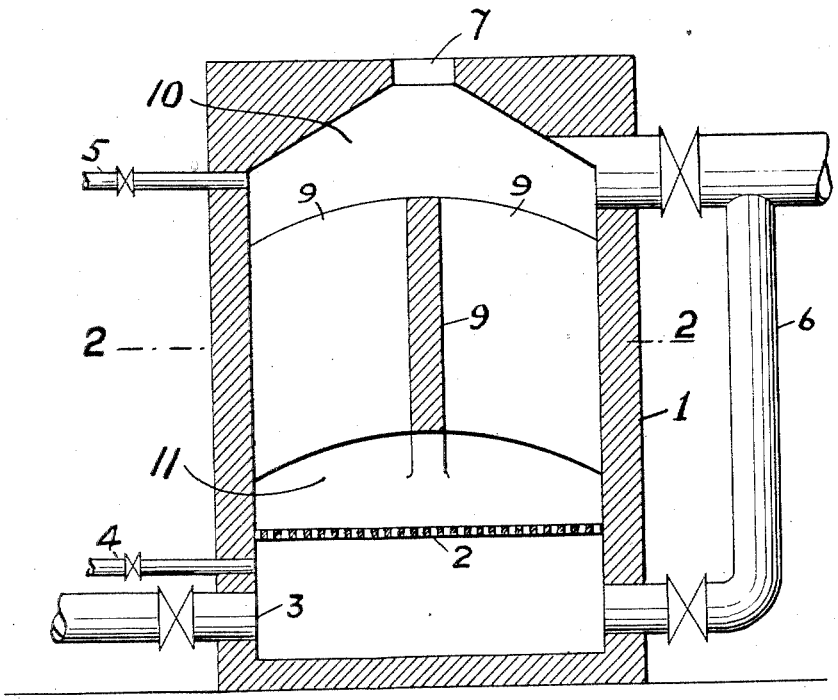

Figure 1 is an elevational view principally in section of a water gas generator embodying features of the invention, and Fig. 2 is a sectional view taken on the line 2—2 of Figure 1.

The water gas generator includes a cylindrical shell 1, a grate 2, means such as 3 for air blasting through the grate, up and down steaming connections 4 and 5, top and bottom gas off-take connections 6, and a fuel inlet 7. There is nothing so far described that is new in gas generators. 8 is a bridge structure cruciform in cross-section and it is spaced above the grate 2 and terminates short of the top of the shell. The bridge structure includes vertical walls 9 radiating from its axis and extending to the inner wall of the shell. There is thus provided a fuel chamber 10 at the top of the generator bounded by the inner wall 1 of the generator, a fuel chamber 11 at the bottom of the generator bounded by the inner wall 1 of the generator, and vertical fuel passages 12 connecting said fuel chambers 10 and 11 and arranged at the intermediate portion of the generator. These passages are formed through the bridge structure which is provided between the top and bottom fuel chambers 10 and 11. The internal wall of the generator and bridge structure may well be of refractory heat radiating material.

The fuel such as bituminous coal that is charged into the generator through the inlet 7 consists of particles which are not all of the same size, but the distribution of these particles is fairly uniform when they reach the passages 12 in the descending fuel column. The air blast tends to follow the walls of a generator but since walls are provided not only in the center but in the body of the fuel as well as at the outer surface of the fuel the friction and heat conditions are substantially identical at all of these walls, thus there is no dead or cold mass of fuel at the axis of the fuel bed nor are there chimney effects at the outer portions of the fuel bed, so that the result is substantially uniform distribution of porosity which results in an enlarged gas making region, consequently the output is increased and the carrying or blowing of dust out at the top above the connection 6 is minimized and rendered negligible.

The chamber 11 which is common to all of the channels 12 and receives fuel therefrom affords space for the accommodation of a mechanical grate and also presents the advantage that steam and air blasts may be delivered through single connections and by ascending through the grate be applied to the fuel bed in even or uniform distribution.

It will be obvious to those skilled in the art to which the invention relates that modifications may be made in matters of mere form without departing from the spirit of the invention which is not limited otherwise than the prior art and the appended claims may require.

I claim:

1. A water gas generator including a single cylindrical shell, a fuel inlet at the top of the shell, a grate, a solid bridge structure spaced below the top of the shell and above the grate and providing vertical walls extending radially across the interior of the shell and providing between them continuous unobstructed vertical passages, a gas offtake connection in communication through the wall of the shell directly with the space above the bridge structure and below the top of the shell, and means for steam and air blasting upward through the grate whereby substantially identical heat and friction conditions are insured at the confronting faces of said walls.

2. A water gas generator comprising a single shell and adapted for making up and down steam runs and having one chamber at the top and one chamber at the bottom bounded respectively by the top, bottom and cylindrical walls of the shell and having uninterrupted and unobstructed passages opening at their ends directly into said chambers and adapted for passing fuel and gas through their open ends from one to the other of the chambers and arranged at the intermediate portion of the shell, a solid bridge structure provided between the top and bottom chambers and in which said passages are formed, air blast connections, up and down steam blast connections, and offtake connections communicating through the wall of the shell directly with said chambers for the passage of air blast gas and water gas.

OWEN B. EVANS.